United States Patent [19]
Beeler

[11] Patent Number: 5,617,783
[45] Date of Patent: Apr. 8, 1997

[54] PEELER WITH INCLINED GROOVES IN SIDE WALL

[75] Inventor: Michael L. Beeler, Modesto, Calif.

[73] Assignee: Beeler Industries, Inc., Salida, Calif.

[21] Appl. No.: 576,210

[22] Filed: Dec. 21, 1995

[51] Int. Cl.$^6$ ................................... A23N 7/00
[52] U.S. Cl. ................ 99/631; 99/516; 99/623; 99/633; 99/634; 426/483
[58] Field of Search ............................ 99/584, 623–634, 99/516, 534–536, 509, 511; 366/314; 241/199.12, 282.1

[56] References Cited

U.S. PATENT DOCUMENTS

| | | |
|---|---|---|
| 877,550 | 1/1908 | Clark . |
| 954,047 | 4/1910 | Powell . |
| 1,701,435 | 2/1929 | Anstiss . |
| 1,902,506 | 3/1933 | Johnston et al. . |
| 1,923,806 | 8/1933 | Anstiss . |
| 1,945,978 | 2/1934 | Palombo et al. . |
| 2,514,493 | 7/1950 | Hetherington . |
| 2,769,473 | 11/1956 | Comber . |
| 2,795,253 | 6/1957 | Coleman et al. . |
| 2,838,083 | 6/1958 | Fox et al. . |
| 3,266,540 | 8/1966 | Bradham . |
| 3,677,314 | 7/1972 | Plana ............................ 99/540 |
| 3,762,308 | 10/1973 | Greene et al. . |
| 3,848,524 | 11/1974 | Semrow ........................ 99/631 |
| 3,851,572 | 12/1972 | Lazzarini ................... 99/625 X |
| 4,143,593 | 3/1979 | Raay ............................ 99/631 |
| 4,230,034 | 10/1980 | Amstad ..................... 99/623 X |
| 4,335,650 | 6/1982 | Prevot ....................... 241/282.1 |
| 4,394,398 | 7/1983 | Wilson ..................... 426/483 X |
| 4,442,764 | 4/1984 | Bos et al. . |
| 4,450,760 | 5/1984 | Wilson ..................... 99/516 X |
| 4,621,573 | 11/1986 | Lange ........................... 99/626 |
| 4,768,429 | 9/1988 | Federighi . |
| 4,785,729 | 11/1988 | Latreyte ........................ 99/536 |
| 4,827,836 | 5/1989 | Neidigh ........................ 99/625 |
| 5,065,672 | 11/1991 | Federighi, Sr. . |
| 5,307,738 | 5/1994 | Amstad ......................... 99/625 |

Primary Examiner—Timothy F. Simone
Attorney, Agent, or Firm—William L. Feeney; Kerkam, Stowell, Kondracki & Clarke, P.C.

[57] ABSTRACT

A peeler uses parallel inclined valleys in a cylindrical interior surface to serve as channels. The parallel valleys are between parallel ridges or ribs. A rotary disk having a series of bumps and an abrasive surface is rotated so as to abrasively remove an outer portion of agricultural products. The debris corresponding to removed portions is urged downwardly and out a peripheral debris exit by the ridges as rotation takes place. A wear rim around the disk has an upper surface and the debris exit is between the wear rim and the interior surface. The interior surface is on a liner having a lower surface. The upper surface of the wear rim is no greater than ¼ inch higher than a lower edge of the liner such that a restricted passage therebetween has a height no greater than ¼ inch. An expansion zone is just below the restricted passage.

23 Claims, 6 Drawing Sheets

PEELER WITH INCLINED GROOVES IN SIDE WALL

BACKGROUND OF THE INVENTION

The present invention relates to a machine and a process for peeling agricultural products. More specifically, it relates to the removal of hulls from nuts, such as pistachios.

As used herein, a peeler is a machine for removing the outer layer from agricultural products, whether or not the product has a distinct outer layer. Those products with a distinct outer layer, such as nuts, have the distinct outer layer removed to leave only the edible or more desirable portion. Those agricultural products without a distinct outer layer may still have their outer portion removed by a peeler in order to remove any portions of the product which may have dirt or other impurities.

Peelers consisting of a rotary disk with an abradant surface turning in a fixed circular motion within a cylinder are common in the food industry and are offered in a variety of configurations. Those skilled in the art of removing the skin or husk from nuts as pistachios currently prefer a peeler using a rotary disk having humps or rises to agitate the product. The disk, which is coated with an abradant such as Carborundum, is mounted in a vertical position and rotates about a fixed location within a cylinder or circular processing chamber at a speed suited for the particular product. A circular processing chamber or cylinder has the disk therein and is equipped with a door for providing an opening in the side for product removal. Vertical non-abrasive ribs (usually in the form of a replaceable liner) are placed about the interior circumference to retard the circular movement of the product while allowing vertical movement. As the abrasive disk under the agricultural product rotates faster than the product, the product is abraded, thus removing its outer layer. Process fluids (such as water) are sprayed into the circular processing chamber onto the product to both soften the skin and wash the peeling or other refuse from the product by a flushing action by a fixed clearance between the spinning rotary disk and processing chamber. A lid is placed on top of the chamber to prevent accidental injury to persons. The lid usually has a door or other means of supplying gravity-fed new product to the processing chamber. Optionally, the means of routing or supporting the necessary plumbing to provide the above-mentioned water is often incorporated with the lid design. A motor is used for turning the rotating disk at a preferred speed. Hydraulic, pneumatic or electric motors are coupled directly or through a drive system to a drive shaft that mounts vertically to a support or frame with an antifriction means such as ball or sleeve bearings that allow circular rotation of the shaft. The rotating disk is fixed at the upper end of the drive shaft, and supported by the drive shaft.

In operation, the processing chamber is filled with a plurality of the product, such as pistachios. An adequate supply of water is then continuously sprayed as the rotary disk spins at a speed that may or may not vary in revolutions per minute. The abrasive action of the rotary disk surface abrades or scraps the skins or husks from the product while the rises or humps located on the rotary disk continually agitates the product in conjunction with the vertical ribs located about the inner periphery of the processing chamber, providing a means of cycling the product in relationship to the abradant action of the rotation disk. As the skin or husk is removed, the water flushes the waste from the system between the rotating disk and the sides of the processing chamber. After the skins or husks have been removed and the rotating disk continues to rotate while the opening in the side is provided, usually by an exit door allowing the centrifugal force to expel the now peeled product from the processing chamber, completing the operation.

The process is usually a continuous batch process where the peeler is maintained in rotation and, following discharge of the peeled product, the exit door is closed and the supply door is opened such that a new batch of product to be processed is supplied into the peeler. Thus, the process includes a cycle of opening a supply door to load the product, closing the supply door, peeling the product through rotation of the peeler, opening an exit door to allow exiting of the processed product, closing the exit door, and repeating the cycle with the peeler maintained in rotation continuous throughout the cycles.

Among prior patents showing various machines for processing agricultural products are the following:

| U.S. Pat. No. | Inventor |
| --- | --- |
| 877,550 | C. H. Clark |
| 954,047 | R. Powell |
| 1,701,435 | G. P. Anstiss |
| 1,902,506 | H. L. Johnston et al |
| 1,923,806 | G. P. Anstiss |
| 1,945,978 | F. J. Palombo et al |
| 2,514,493 | H. R. Hetherington |
| 2,769,473 | W. R. Comber |
| 2,795,253 | R. A. Coleman et al |
| 2,838,083 | G. B. Fox et al |
| 3,266,540 | C. Bradham |
| 3,762,308 | Greene et al |
| 4,442,764 | Bos et al |
| 4,768,429 | Federighi |
| 5,065,672 | Federighi, Sr. |

This process to date can only be deemed only partly successful because the random nature of removing the product skins or husks from the processing chamber, the result being the product remains in the peeling device for a process period that extends beyond what is reasonable.

Many prior designs pose a dilemma in choosing their time of use. If the nuts or other agricultural products are removed from the machine too soon, the amounts and likelihood of incompletely processed product (i.e., product having significant portions of peel or hull remaining in place) will be unacceptably high. However, if the nuts or other agricultural products are processed in the peeler machine too long, the amounts and likelihood of damaged product is increased. That is, processing for a long time may not only remove the peels of the products, but may also abrade away non-peel portions of the product, thereby increasing the waste by damaging or reducing the size of individual pieces of the usable output of the process. Depending on the characteristics of the agricultural product being peeled and the peeler, it may be impossible to select a dwell time (time in which abrasive peeling is performed) which avoids both problems. Thus, if one wants to completely peel all of the product, this may necessarily require one to put up with a higher amount of waste than is preferable.

Another disadvantage of many prior peelers is a tendency to wear out some parts faster than is desirable. Often a part called a wear rim wears out faster than is desirable. Upon it wearing out, the wear rim must be replaced right away or the performance of the peeler will be significantly degraded with associated increased product loss.

Another disadvantage of many prior peelers is that the speed used for the peeling results in product damage from excessive battering of the product as it exits the peeler. Also, the speed causes sporadic and uneven flow as the door or doors of the peeler open. However, lowering the speed of rotation used for the peeling lowers the throughput of the peeler (amount of product which can be processed in a given amount of time) and, if lowered sufficiently, may even prevent the peeling from being sufficiently complete.

OBJECTS AND SUMMARY OF THE INVENTION

Accordingly, it is a primary object of the present invention to provide a new and improved machine for peeling agricultural products.

Another primary object is to provide a new and improved process for peeling agricultural products.

A more specific object of the present invention is to provide faster peeling of agricultural products.

A further object of the present invention is to provide peeling of agricultural products with reduced amounts and likelihood of damaged product compared to prior peeling arrangements.

A further object of the present invention is to provide peeling of agricultural products with reduced amounts and likelihood of incompletely processed product (i.e., product having significant portions of peel or hull remaining in place) compared to prior peeling arrangements.

Yet another object of the present invention is to provide peeling of agricultural products with reduced wear of the peeling machine for a given amount of throughput (i.e., product passed through a peeler).

A further object of the present invention is to provide peeling of agricultural products with improved speed of separation between removed peel portions and the non-peel portions.

Yet another object of the present invention is to provide improved peeling of agricultural products using the retrofitting of improvements onto prior peeling machines.

The above and other features of the present invention which will be more readily understood when the following detailed description is considered in conjunction with the accompanying drawings are realized by using the centrifugal force provided by a rotating disk along with an immediate expansion area between the rotating disk and liner to (1) expedite material flow towards the clearance between the rotating disk and process chamber wall and (2) remove the waste product faster than with the previous systems requiring the sandwiched refuse to work its way down between the rotating disk and process cylinder wall.

This is accomplished by providing a diagonal grooving pattern about the interior periphery of the processing chamber or cylinder, along with a precision wear rim about the diameter of the rotary disk and matching the contour of that disk. The top surface of that rim at its lowest point is even with or slightly higher than the bottom of the diagonal grooving pattern, thus providing an expansion area cavity immediately below the diagonal grooving pattern.

The invention may be described as a peeler. The peeler has a housing with a cylindrical chamber therein for holding agricultural products for abrasive peeling. A disk serves as a lower boundary to the cylindrical chamber. An interior surface extends around the cylindrical chamber, the interior surface having a plurality of inclined inwardly projecting portions with inclined valleys serving as channels between adjacent projecting portions. A motor is operably connected to cause relative rotation between the disk and the interior surface. A debris exit is located at an outer periphery of the disk, the debris exit having dimensions which allow passage of materials abraded off of agricultural products and which preclude passage of the agricultural products therethrough. A product exit communicates with the cylindrical chamber for allowing exit of processed agricultural product therefrom. Material abraded off of agricultural products is urged downwardly and out the debris exit from the relative rotation of the disk and the interior surface causing the debris to be moved along the inclined valleys serving as channels.

The projecting portions are a plurality of parallel ridges with the valleys being parallel to the ridges and disposed between adjacent pairs of ridges. The interior surface is part of a peeler liner placed around the cylindrical chamber and within the housing. The valleys are inclined relative to a horizontal plane so as to define an angle of inclination of no more than 80 degrees (the smallest of the two angles defined, thus the acute angle). In other words, the valleys are not vertical and they deviate from vertical by at least 10 degrees relative to vertical. A wear rim extends around a periphery of the disk, the wear rim having an upper surface. The interior surface has a lower edge, and the debris exit is located between the wear rim and the interior surface. The upper surface of the wear rim is no more than ¼ inch higher than the lower edge of the interior surface so as to define a restricted passage having a height of no more than ¼ inch. The debris exit includes an expansion zone just below the restricted passage.

The invention may also be described as a peeler including: a housing with a cylindrical chamber therein for holding agricultural products for abrasive peeling; a disk serving as a lower boundary to the cylindrical chamber and having a wear rim around its periphery, the wear rim having an upper surface; an interior surface around the cylindrical chamber, the interior surface having a lower edge and a plurality of inwardly projecting portions with valleys between adjacent projecting portions; a motor operably connected to cause relative rotation between the disk and the interior surface; a debris exit located at an outer periphery of the disk between the wear rim and the interior surface, the debris exit having dimensions which allow passage of materials abraded off of agricultural products and which preclude passage of the agricultural products therethrough; and a product exit communicating with the cylindrical chamber for allowing exit of processed agricultural product therefrom. The upper surface of the wear rim is no more than ¼ inch higher than the lower edge of the interior surface so as to define a restricted passage having a height of no more than ¼ inch. The projecting portions are a plurality of parallel ridges with the valleys being parallel to the ridges and disposed between adjacent pairs of ridges. The interior surface is part of a peeler liner placed around the cylindrical chamber and within the housing. The valleys are inclined relative to a horizontal plane so as to define an angle of inclination of no more than 80 degrees. The valleys are inclined and material abraded off of agricultural products is urged downwardly and out the debris exit from the relative rotation of the disk and the interior surface causing the debris to be moved along the inclined valleys serving as channels.

The invention may alternately be described as a peeler liner for lining an interior of a cylindrical chamber of a peeler, the peeler liner including: sheet material having an upper edge, a lower edge parallel to the upper edge, an interior surface and an outer surface; a plurality of parallel projecting ridges projecting out from the interior surface, the ridges extending from the upper edge to the lower edge; and a plurality of parallel valleys operable to serve as debris channels between adjacent ridges and parallel to the ridges; and wherein the ridges and valleys are inclined relative to the upper and lower edges so as to define an angle of inclination of no more than 80 degrees. The sheet material is metal, more specifically, stainless steel. The ridges project less than ¼ inch. The upper and lower edges are arcuate. The peeler liner is combined with a peeler as described above and with the interior surface of the liner serving as the interior surface of the cylindrical chamber.

The peeler may also includes a product exit door movable between open and closed positions at the product exit, a door actuator operably connected to the door for controlling the position of the door, and a controller operably connected to the door actuator and at least one of the group consisting of: the disc, and the interior surface. The controller is operable to control a speed of relative rotation between the disk and the interior surface and to maintain the speed of relative rotation at least at a minimum peeling speed when the peeler is in a peeling mode. The controller is operable, at completion of the peeling mode: to lower the speed of relative rotation to a non-zero exit speed, and to actuate the door actuator such that the product exit door opens for allowing exit of processed agricultural product therefrom.

The present invention may alternately be described as a method of peeling an agricultural product, the steps including: placing agricultural products in the cylindrical chamber of a peeler as described above; causing relative rotation between the disc and the interior surface so as to abrasive peel the agricultural product; and urging material abraded off of the agricultural product downwardly and out the debris exit from the relative rotation of the disk and the interior surface causing the debris to be moved along the inclined valleys serving as channels. Debris passing out the debris exit passes through a restricted passage having a height no greater than ¼ inch. Debris passing out the restricted passage enters an expansion zone between an outer periphery of the disk and a surface radially outside of the interior surface.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
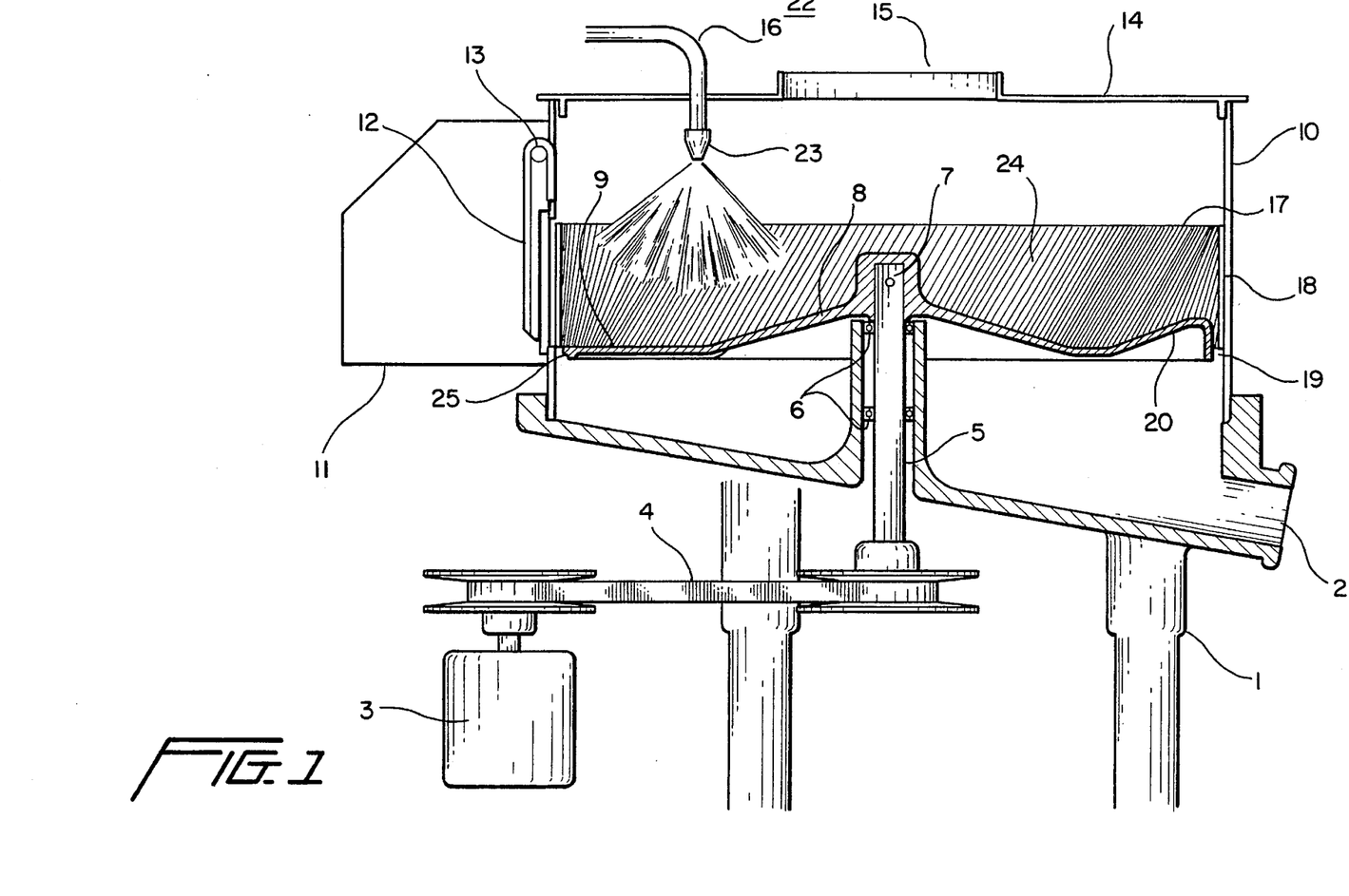
FIG. 1 is a cross section elevation view of the preferred embodiment of a peeler.

Referring to FIG. 1 of the drawings, a peeler has a frame 1 of conventional design supported by legs or other supports. The frame 1 is supplied with a drainage port 2 for peels, husks, or other refuse as well as process fluids. The frame houses rotational bearings 6 that in turn support the drive shaft 5 in a vertical position while allowing rotational movement to the drive shaft. The drive shaft is driven by a motor 3 either directly coupled or through a geared drive 4.

Attached to the upper end of the drive shaft by pins 7 or keys is a circular disk 8 usually of cast metal construction incorporating a series of rises or "bumps" 20 with an abrasive upper surface 9. The disk is centered in a cylindrical process chamber 10 with an opening 21 available through a slide gate or door 12 that can be swung upon by a hinge 13 usually located in the area above the door. About the door a processed product passageway 11 may be incorporated into the process chamber. The cylindrical process chamber 10 may be attached to or incorporated in the frame 1 and is enclosed by a cover or lid 14 that is removed to add unprocessed product or is equipped with an opening 15 for adding the product. Additional openings 22 provide access for processing fluids (usually water) 23 supplied during the peeling operation by plumbing 16 often incorporating a nozzle 24 to direct or better disperse the processing fluids. To prevent the rotation of product caused by the rotating disk 8, a plurality of ribs or ridges 24 is incorporated about the inner circumference of the cylindrical processing chamber 10. The ridges 24, which project inwardly into the chamber, may be manufactured into housing of the processing chamber (not shown) or (as shown) by using a circular liner 17 of a rigid cast or formed material (such as stainless steel) mechanically fastened or bonded to the inside wall of the processing chamber. The ribs or ridges 24 extend diagonally to a height even with or above the product during the peeling or skinning process and terminates at or slightly below a wear rim 25 that resides about the outer periphery of the rotating disk providing an expansion zone or cavity area 19 directly below the liner. Additionally, the liner may be located, supported and/or reinforced by the addition of a spacer ring 18 of rigid or semi-rigid material that sandwiches between the ribbed liner and inner wall of the processing chamber. This ribbing pattern is also incorporated onto the inner radius of the hinged door.

Figure 2:
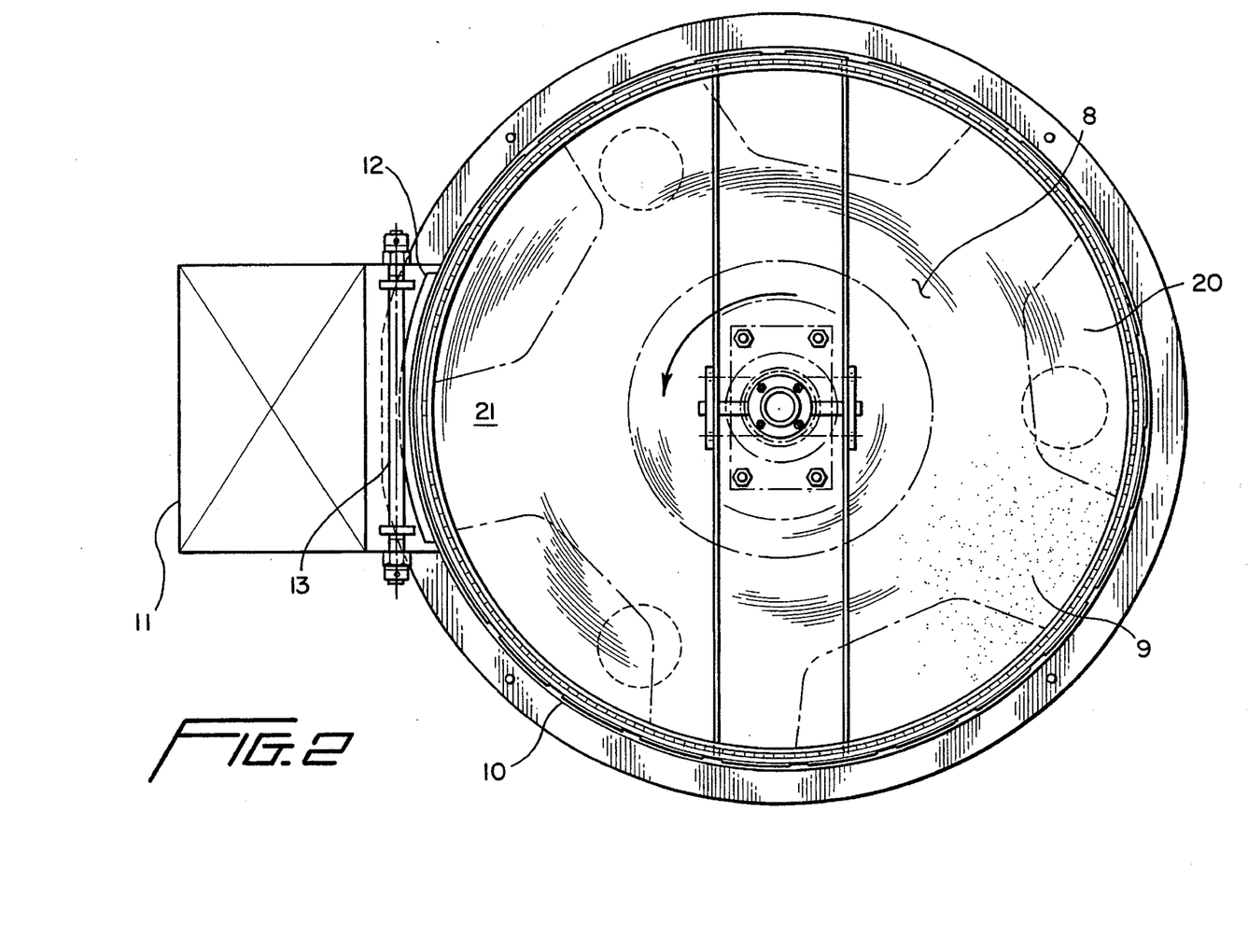
FIG. 2 is a top view of the preferred embodiment of the peeler.

FIG. 2 illustrates the rotating disk's 8 central relationship to the cylindrical processing chamber 10 with the approximate hinge location 13 allowing the door 12 opening into the discharge area 11.

Figure 3:
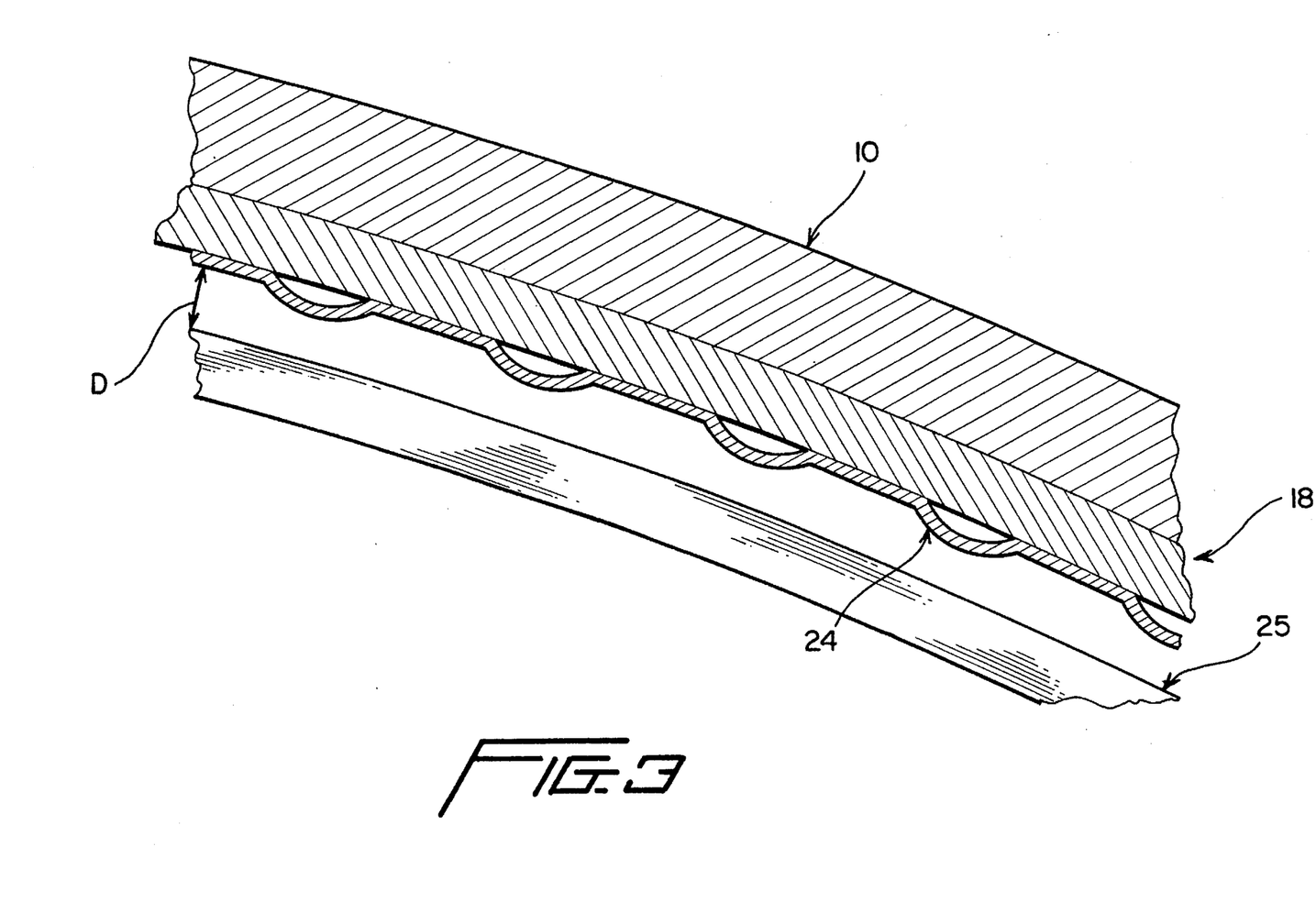
FIG. 3 is a cross section view of a typical grooving pattern and associated parts.

FIG. 3 illustrates typical lay-out and profiles of the grooves or valleys (alternating with the ridges or ribs 24) utilizing a pressed sheet metal liner (such as stainless steel) construction that may have, but are not limited to, those profiles as described in the incorporated by reference Johnston patent. Most importantly, and unlike the ridges of Johnston, the ridges 24 are inclined (i.e., not vertical). Accordingly, debris removed from the nuts or other agricultural product would be channeled downwardly towards the circumferential debris exit corresponding to radial distance D, which distance is preferably in the range from ¼ inch to 7/32 inch for pistachios. The distance D and the angle and pattern in which the grooves are symmetrically placed would depend on the characteristics of the particular product being peeled. The debris exit has dimensions too small to allow the pistachios or other agricultural products to pass through it. Therefore, only the peel, hull, or other removed debris can pass therethrough.

Figure 4:
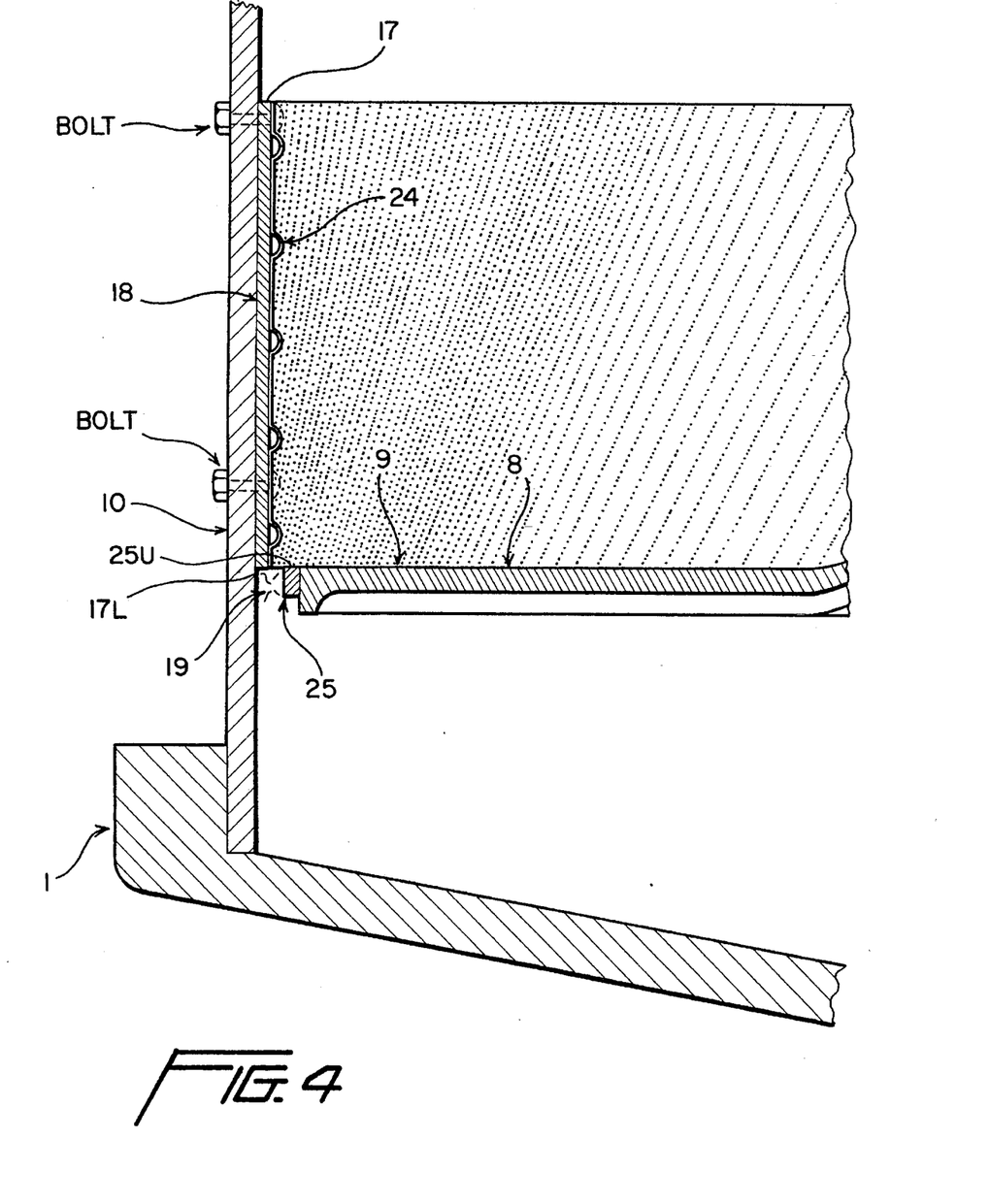
FIG. 4 is a cross section view of the relationship between a rotary disk, wear rim, diagonal grooving and expansion area cavity.

FIG. 4 illustrates the relationship between the wear rim 25 located on the rotational disk 8 and liner 17 mounted to the spacer 18 and processing chamber 10 interior producing a cavity 19 directly below the working surface of the rotating disk 8. Importantly, the upper surface 25U of the wear rim 25 is no more than ¼ inch above the lower edge 17L of liner 17 such that the restricted passage corresponding to the radially offset between the outer surface of wear rim 25 and the interior surface of the liner 17 has a height of no more than ¼ inch. More preferably, the upper surface 25U is at the same vertical level as the lower edge 17L such that the restricted passage has a negligible height. Limiting the height of the restricted passage improves the life of the wear rim 25 (usually made of mild steel) because debris rubs against it less than in many prior designs having a restricted passage substantially greater in height than ¼ inch.

Additionally, the cavity 19 may be considered to be an expansion zone in which the debris which has passed through the restricted passage may readily drop without the resistance and greater likelihood of blockage as in the restricted passage.

Figure 5:
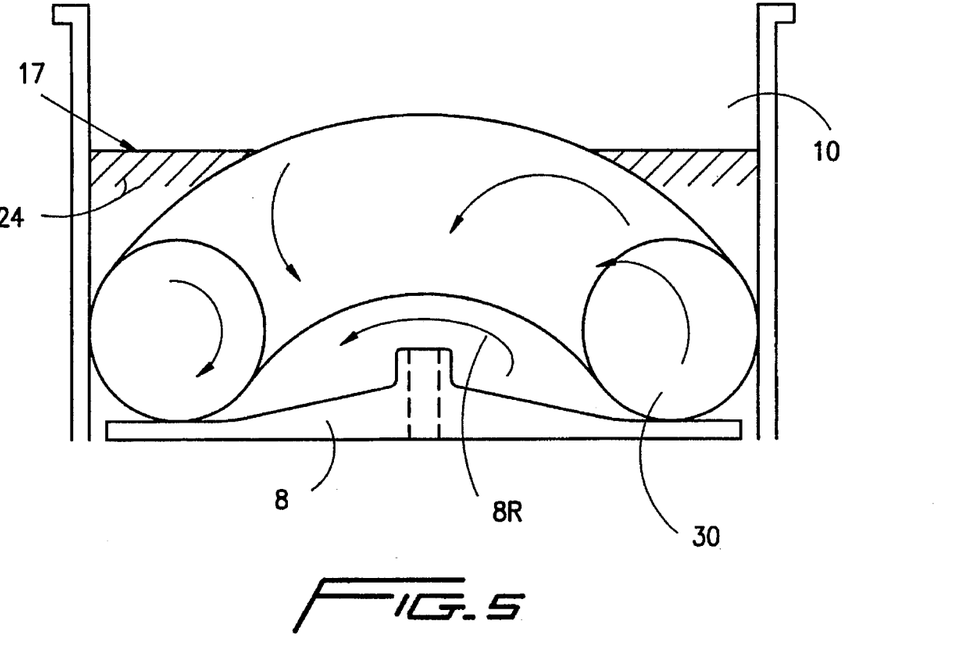
FIG. 5 is a simplified side view showing a pattern of movement within the peeler.

FIG. 5 shows how the rotation of the disk 8 relative to the liner 17 moves the product in a doughnut like toroidal spiral 30. Most importantly, and as shown in FIG. 5, the inclination of the ridges 24 (only partially shown) is down and with the direction of movement of the outer periphery of disk 8. Therefore, debris is vectored down (not up) by the cooperation of the rotation and the inclination.

Figures 6, 7:
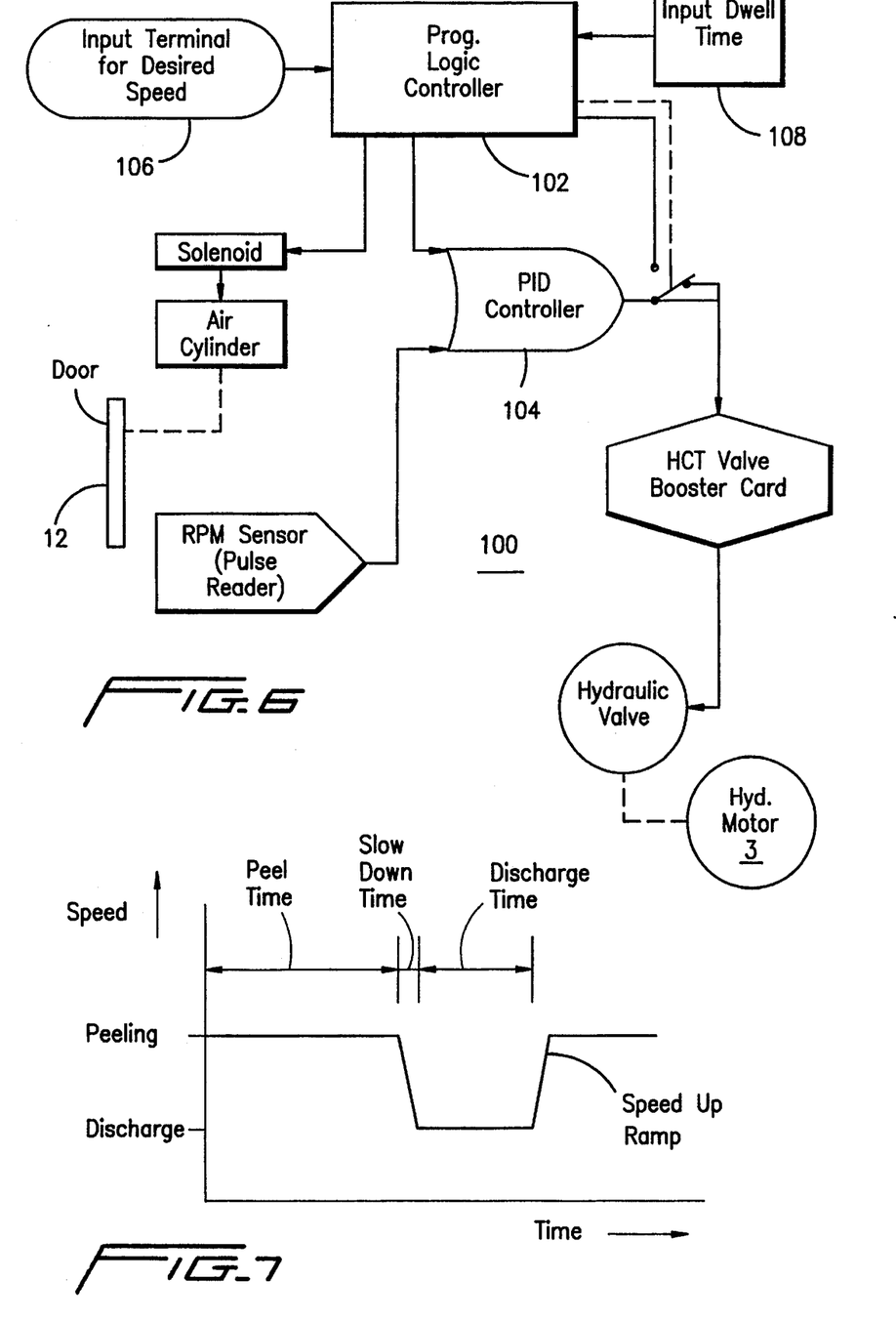
FIG. 6 is a simplified block diagram of a control arrangement which is used.
FIGS. 7 and 8 are speed versus time graphs illustrating the operation of the control arrangement of FIG. 6.

FIG. 6 shows a controller arrangement according to the present invention. The controller avoids problems associated with ejection of the peeled nuts or other product. In particular, and referring back momentarily to FIG. 1, if the disc 8 rotates at too high a rate of speed when peeled nuts are exiting through door 12, the nuts may be damaged by excessive battering of the nuts. Also, such high speed exiting may cause sporadic and uneven flow of the nuts as the door or doors open. As will be discussed, the FIG. 6 arrangement avoids or minimizes these problems.

Generally, FIG. 6 is a controller 100 which includes all the parts illustrated therein except for the door 12 and hydraulic motor 3 (which rotates disc 8 of FIG. 1). The controller 100 may include a programmable logic controller (PLC) 102 and a PID controller 104, both of known design. A desired speed and a desired dwell time are entered respectively at 106 and 108 and PLC operates the peeler according to the entered values. Generally, a peeling speed of about 120 to 135 revolutions per minute (RPM) would be used and, depending on the condition of the nuts placed in the peeler, about 1 minute dwell time could be used. For all but about the last two to five seconds of the dwell time, the PLC 102 supplies a signal on line 110 to PID controller 104 corresponding to the desired peeling speed. PID controller 104 compares the signal on line 110 with a signal provided on line 112 by RPM sensor 114. The output of PID controller 104 provides feedback control of hydraulic motor 3 via controlled switch 116, HCT (commercially available brand name) valve booster card 118, and hydraulic valve 120. The hydraulic valve 120 operates in known fashion to maintain the RPMs of the motor 3 and/or disc 8 at the desired value. The booster card sends a pulse width modulated signal to the valve 120, which partially opens or closes depending on the signal.

A timer 122, which is shown separately, but could simply be internal to the PLC 102, is used in known fashion such that the PLC 102 tests whether peeling has occurred for the desired dwell time less a slow down time. When the peeling has occurred for that time interval, PLC 102 sends a signal to controlled switch 116 which switches it from its illustrated position to a position where the input (top in the FIG.) of card 118 is supplied by PLC 102 via its line 124. With reference to FIG. 7, the completion of the peel time at peeling speed is followed by the PLC 102 causing a slowdown corresponding to slowdown time of FIG. 7. The slowdown time may be fixed by initialization of the PLC or may be user controlled. When the slowdown time is complete, as determined by the PLC, the PLC signals solenoid 126 to activate air cylinder 128. Air cylinder 128 serves as a door actuator to open the product exit door 12 such that product (peeled nuts) may exit the process chamber of FIG. 1 during a discharge time (for example about 8 seconds).

When the door is open and the nuts are exiting, the rotation of the disc 8, which may be at the same or a different speed than the hydraulic motor 3 is at a discharge speed, which may, for example be 60 RPM. In that fashion, the battering and flow which is sporadic and uneven is minimized or avoided. By providing faster exiting of the nuts due to the avoidance or minimization of the sporadic and uneven flow, the peeler provides faster processing for a given amount of nuts and a higher throughput of product for a given amount of time. Also, the peeling speed need not be held low to minimize or avoid battering and flow which is sporadic and uneven. Instead, one can set the peeling speed at the best speed for peeling without regard to problems of ejecting nuts at that speed. The PLC 102 can be initialized to provide a set discharge speed (for example 60 RPM) or can be initialized to provide a discharge speed which is a given percentage (for example 50%) of the peeling speed. Alternately, the discharge speed could be programmed by an operator at a given value or percentage of the peeling speed. Upon completion of the discharge time, PLC 102 causes (via solenoid 126 and air cylinder 128) exit or discharge door 12 to close. Controlled switch 116 moves back to the illustrated position under control of the PLC such that the output of PID controller 104 now speeds up the motor 3, corresponding to the speed up ramp of FIG. 7. Although not shown, a product supply door, under control of PLC 102, would be opened to allow a new batch of product into the peeler and then closed, whereupon the processing cycle is repeated.

Figure 8:
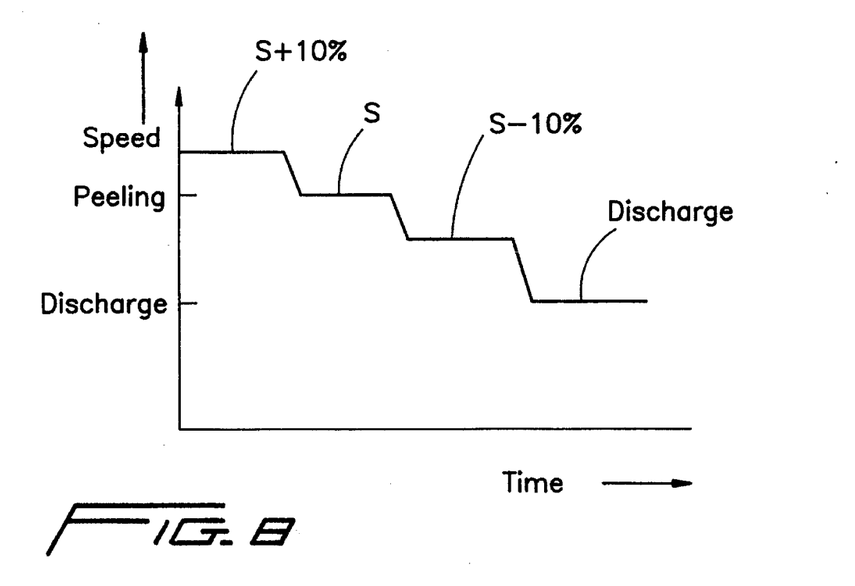

With reference now to FIG. 8, the controller 100 of FIG. 6 may alternately divide the peeling operation into portions, such as thirds, with the first third having peeling performed at an RPM corresponding to S plus ten percent of S where S is an operator supplied value. The second third of peeling is performed at speed S, whereas the last third of peeling is performed at speed S less ten percent of S. (The portions are about thirds as the times during which the speed is changing from S plus ten percent to S or from S to S minus ten percent would be relatively short.) In this case, S minus ten percent could be considered as a minimum peeling speed (e.g., minimum absent resetting of the PLC) at which peeling is performed. Following the last third, a slowdown occurs followed by a discharge speed as with FIG. 7. In the case of FIG. 8, the PLC 102 would provide a signal on line 110 (see FIG. 6) corresponding to S plus ten percent, then a signal corresponding to S, and then a signal corresponding to S minus ten percent.

Although the PLC 102 and PID controller 104 are shown as separate units in FIG. 6, their functions could alternately be performed by a single component.

Thus, the present invention provides faster throughput of agricultural product, higher efficiency, and less wear on the machine than prior designs. This is accomplished by having the inclined ribs or ridges which vector or channel the debris down. Also, the limited vertical overlap between the wear rim 25 and liner 17 creates a restricted passage which blocks product flow therethrough, but has a smaller height than previously used such that blockage and resistance to debris passing out is less than prior designs. Further, the expansion zone just below the restricted passage aids in fast debris removal. The improved efficiency allows one to more quickly peel a product so that less waste will occur. Further, the speed control arrangement provides various advantages in operation.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended hereto.

What is claimed is:

1. A peeler comprising:

a housing with a cylindrical chamber therein for holding agricultural products for abrasive peeling;

a disk serving as a lower boundary to the cylindrical chamber;

an interior surface around the cylindrical chamber, the interior surface having a plurality of inclined inwardly projecting portions with inclined valleys serving as channels between adjacent projecting portions;

a motor operably connected to cause relative rotation between the disk and the interior surface;

a debris exit located at an outer periphery of the disk, the debris exit having dimensions which allow passage of materials abraded off of agricultural products and which preclude passage of the agricultural products therethrough; and a product exit communicating with the cylindrical chamber for allowing exit of processed agricultural product therefrom; and wherein material abraded off of agricultural products is urged downwardly and out the debris exit from the relative rotation of the disk and the interior surface causing the debris to be moved along the inclined valleys serving as channels.

2. The peeler of claim 1 wherein the projecting portions are a plurality of parallel ridges with the valleys being parallel to the ridges and disposed between adjacent pairs of ridges.

3. The peeler of claim 2 wherein the interior surface is part of a peeler liner placed around the cylindrical chamber and within the housing.

4. The peeler of claim 2 wherein the valleys are inclined relative to a horizontal plane so as to define an angle of inclination of no more than 80 degrees.

5. The peeler of claim 1 further comprising a wear rim around a periphery of the disk, the wear rim having an upper surface; and wherein the interior surface has a lower edge, and wherein the debris exit is located between the wear rim and the interior surface, and wherein the upper surface of the wear rim is no more than ¼ inch higher than the lower edge of the interior surface so as to define a restricted passage having a height of no more than ¼ inch.

6. The peeler of claim 5 wherein the debris exit includes an expansion zone just below the restricted passage.

7. A peeler comprising:

a housing with a cylindrical chamber therein for holding agricultural products for abrasive peeling;

a disk serving as a lower boundary to the cylindrical chamber and having a wear rim around its periphery, the wear rim having an upper surface;

an interior surface around the cylindrical chamber, the interior surface having a lower edge and a plurality of inwardly projecting portions with valleys between adjacent projecting portions;

a motor operably connected to cause relative rotation between the disk and the interior surface;

a debris exit located at an outer periphery of the disk between the wear rim and the interior surface, the debris exit having dimensions which allow passage of materials abraded off of agricultural products and which preclude passage of the agricultural products therethrough; and a product exit communicating with the cylindrical chamber for allowing exit of processed agricultural product therefrom; and wherein the upper surface of the wear rim is no more than ¼ inch higher than the lower edge of the interior surface so as to define a restricted passage having a height of no more than ¼ inch.

8. The peeler of claim 7 wherein the projecting portions are a plurality of parallel ridges with the valleys being parallel to the ridges and disposed between adjacent pairs of ridges.

9. The peeler of claim 8 wherein the interior surface is part of a peeler liner placed around the cylindrical chamber and within the housing.

10. The peeler of claim 8 wherein the valleys are inclined relative to a horizontal plane so as to define an angle of inclination of no more than 80 degrees.

11. The peeler of claim 7 wherein the debris exit includes an expansion zone just below the restricted passage.

12. The peeler of claim 11 wherein the valleys are inclined and material abraded off of agricultural products is urged downwardly and out the debris exit from the relative rotation of the disk and the interior surface causing the debris to be moved along the inclined valleys serving as channels.

13. A peeler liner for lining an interior of a cylindrical chamber of a peeler, the peeler liner comprising:

sheet material having an upper edge, a lower edge parallel to the upper edge, an interior surface and an outer surface;

a plurality of parallel projecting ridges projecting out from the interior surface, the ridges extending from the upper edge to the lower edge; and a plurality of parallel valleys operable to serve as debris channels between adjacent ridges and parallel to the ridges; and wherein the ridges and valleys are inclined relative to the upper and lower edges so as to define an angle of inclination of no more than 80 degrees.

14. The peeler liner of claim 13 wherein the sheet material is metal.

15. The peeler liner of claim 13 wherein the sheet material is stainless steel and the ridges project less than ¼ inch.

16. The peeler liner of claim 13 combined with a peeler comprising:

a housing with a cylindrical chamber therein for holding agricultural products for abrasive peeling, the peeler liner being supported by the housing;

a disk serving as a lower boundary to the cylindrical chamber;

the interior surface of the peeler liner extending around the cylindrical chamber, the inclined valleys serving as channels;

a motor operably connected to cause relative rotation between the disk and the interior surface;

a debris exit located at an outer periphery of the disk, the debris exit having dimensions which allow passage of materials abraded off of agricultural products and which preclude passage of the agricultural products therethrough; and a product exit communicating with the cylindrical chamber for allowing exit of processed agricultural product therefrom; and wherein material abraded off of agricultural products is urged downwardly and out the debris exit from the relative rotation of the disk and the interior surface causing the debris to be moved along the inclined valleys serving as channels.

17. The peeler liner of claim 13 wherein the upper and lower edges are arcuate.

18. A method of peeling an agricultural product, the steps comprising:

placing agricultural products in a cylindrical chamber of a peeler, the peeler having:
a housing with the cylindrical chamber therein;
a disk serving as a lower boundary to the cylindrical chamber;
an interior surface around the cylindrical chamber, the interior surface having a plurality of inclined inwardly projecting portions with inclined valleys serving as channels between adjacent projecting portions;
a motor operably connected to cause relative rotation between the disk and the interior surface;
a debris exit located at an outer periphery of the disk, the debris exit having dimensions which allow passage of materials abraded off of agricultural products and which preclude passage of the agricultural products therethrough; and
a product exit communicating with the cylindrical chamber for allowing exit of processed agricultural product therefrom;

causing relative rotation between the disc and the interior surface so as to abrasive peel the agricultural product; and urging material abraded off of the agricultural product downwardly and out the debris exit from the relative rotation of the disk and the interior surface causing the debris to be moved along the inclined valleys serving as channels.

19. The method of claim 18 wherein debris passing out the debris exit passes through a restricted passage having a height no greater than ¼ inch.

20. The method of claim 19 wherein debris passing out the restricted passage enters an expansion zone between an outer periphery of the disk and a surface radially outside of the interior surface.

21. The peeler of claim 1 further comprising a product exit door movable between open and closed positions at the product exit, a door actuator operably connected to the door for controlling the position of the door, and a controller operably connected to the door actuator and at least one of the group consisting of: the disc, and the interior surface; the controller operable to control a speed of relative rotation between the disk and the interior surface, the controller operable to maintain the speed of relative rotation at least at a minimum peeling speed when the peeler is in a peeling mode, and operable, at completion of the peeling mode:

to lower the speed of relative rotation to a non-zero exit speed, and to actuate the door actuator such that the product exit door opens for allowing exit of processed agricultural product therefrom.

22. A peeler comprising:

a housing with a cylindrical chamber therein for holding agricultural products for abrasive peeling;

a disk serving as a lower boundary to the cylindrical chamber;

an interior surface around the cylindrical chamber, the interior surface having a plurality of inclined inwardly projecting portions with valleys serving as channels between adjacent projecting portions;

a motor operably connected to cause relative rotation between the disk and the interior surface;

a debris exit located at an outer periphery of the disk, the debris exit having dimensions which allow passage of materials abraded off of agricultural products and which preclude passage of the agricultural products therethrough; and a product exit communicating with the cylindrical chamber for allowing exit of processed agricultural product therefrom; and wherein material abraded off of agricultural products moves towards the debris exit in the valleys serving as channels; and further comprising:

a product exit door movable between open and closed positions at the product exit, a door actuator operably connected to the door for controlling the position of the door, and a controller operably connected to the door actuator and operably connected to at least one of the group consisting of: the disc, and the interior surface;

the controller operable to control a speed of relative rotation between the disk and the interior surface, the controller operable to:

maintain the speed of relative rotation at least at a minimum peeling speed when the peeler is in a peeling mode, and operable, at completion of the peeling mode:

to lower the speed of relative rotation to a non-zero exit speed, and to actuate the door actuator such that the product exit door opens for allowing exit of processed agricultural product therefrom.

23. The peeler of claim 22 wherein the motor is operably connected to rotate the disc and wherein the inwardly projecting portions are inclined and the valleys are inclined, and wherein material abraded off of agricultural products is urged downwardly and out the debris exit from the relative rotation of the disk and the interior surface causing the debris to be moved along the inclined valleys serving as channels.

* * * * *